United States Patent
Cook et al.

(10) Patent No.: US 12,095,577 B2
(45) Date of Patent: Sep. 17, 2024

(54) CONFERENCING VIRTUAL MODERATOR

(71) Applicant: INTERNATIONAL BUSINESS MACHINES CORPORATION, Armonk, NY (US)

(72) Inventors: Cedric D. Cook, Richmond, TX (US); Zachary A. Silverstein, Georgetown, TX (US); Tyler Hansen, Tucson, AZ (US); ShaYanna Mungo, Clayton, NC (US)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 17/821,197

(22) Filed: Aug. 22, 2022

(65) Prior Publication Data

US 2024/0064036 A1  Feb. 22, 2024

(51) Int. Cl.
*H04L 12/18* (2006.01)

(52) U.S. Cl.
CPC ...... *H04L 12/1822* (2013.01); *H04L 12/1818* (2013.01); *H04L 12/1831* (2013.01)

(58) Field of Classification Search
CPC ............ H04L 12/1822; H04L 12/1818; H04L 12/1831
See application file for complete search history.

(56) References Cited

U.S. PATENT DOCUMENTS

| | | | |
|---|---|---|---|
| 8,489,442 B1 * | 7/2013 | Mohler | G06Q 10/109 705/7.12 |
| 10,684,747 B2 | 6/2020 | Hurwitz | |
| 2012/0229446 A1 * | 9/2012 | Hyndman | G09B 5/06 345/473 |
| 2012/0321062 A1 | 12/2012 | Fitzsimmons | |
| 2014/0108085 A1 * | 4/2014 | Henriksen | G06Q 10/109 705/7.19 |
| 2014/0164510 A1 * | 6/2014 | Abuelsaad | G06Q 10/109 709/204 |
| 2016/0212466 A1 | 7/2016 | Nauseef | |

(Continued)

FOREIGN PATENT DOCUMENTS

CN        107615274 A    1/2018

OTHER PUBLICATIONS

IBM Watson Media, "IBM Video Streaming Integration for Cisco Webex", https://www.ibm.com/downloads/cas/XVGBBG8D, 2019, pp. 1-2.

(Continued)

*Primary Examiner* — Raqiul A Choudhury
(74) *Attorney, Agent, or Firm* — Kristofer Haggerty

(57) ABSTRACT

A method, a structure, and a computer system for conferencing monitoring. The exemplary embodiments may include extracting one or more conference targets from a conference and extracting one or more discussion topics from the conference in real-time. The exemplary embodiments may further include tracking a progress of completing the one or more conference targets based on the one or more discussion topics. The exemplary embodiments may additionally include labelling the one or more conference targets as completed or requiring follow-up based on the progress of completing the one or more conference targets, and for the one or more conference targets labelled as requiring follow-up, scheduling a follow-up conference.

17 Claims, 2 Drawing Sheets

(56) References Cited

U.S. PATENT DOCUMENTS

| | | |
|---|---|---|
| 2019/0266238 A1* | 8/2019 | Faulkner .............. H04L 12/1813 |
| 2019/0305976 A1 | 10/2019 | Bender |
| 2020/0160278 A1 | 5/2020 | Allen |
| 2020/0176010 A1 | 6/2020 | Anders |
| 2020/0236069 A1 | 7/2020 | Nowak-Przygodzki |
| 2020/0279567 A1 | 9/2020 | Adlersberg |
| 2020/0342895 A1* | 10/2020 | Jung ....................... G10L 15/26 |

OTHER PUBLICATIONS

Wiggers, "Empath's AI detects emotion from your voice," VentureBeat, Sep. 8, 2019, https://venturebeat.com/ai/empaths-ai-measures-emotion-from-voice/, 16 pages.

* cited by examiner

CONFERENCING VIRTUAL MODERATOR

BACKGROUND

The exemplary embodiments relate generally to conferencing platforms, and more particularly to vocal inflection-aware moderation of conferencing platforms.

Virtual conferencing can take the form of chat, audioconferencing, videoconferencing, and other collaborative conferencing platforms. The growth of virtual conferencing has grown an order of magnitude due to distanced business locations, improved networks, improved digital resources, increased online presence, and remote work, to name a few. As a result, it becomes particularly important to have definitive conference objectives, action items, and follow-ups in order to maintain productivity even while collaborating virtually. A lack thereof may invoke complacency or misdirected solutions, and silently induce financial and productivity losses.

SUMMARY

The exemplary embodiments disclose a method, a structure, and a computer system for a vocal inflection-aware virtual moderator. The exemplary embodiments may include extracting one or more conference targets from a conference and extracting one or more discussion topics from the conference in real-time. The exemplary embodiments may further include tracking a progress of completing the one or more conference targets based on the one or more discussion topics. The exemplary embodiments may additionally include labelling the one or more conference targets as completed or requiring follow-up based on the progress of completing the one or more conference targets, and for the one or more conference targets labelled as requiring follow-up, scheduling a follow-up conference.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
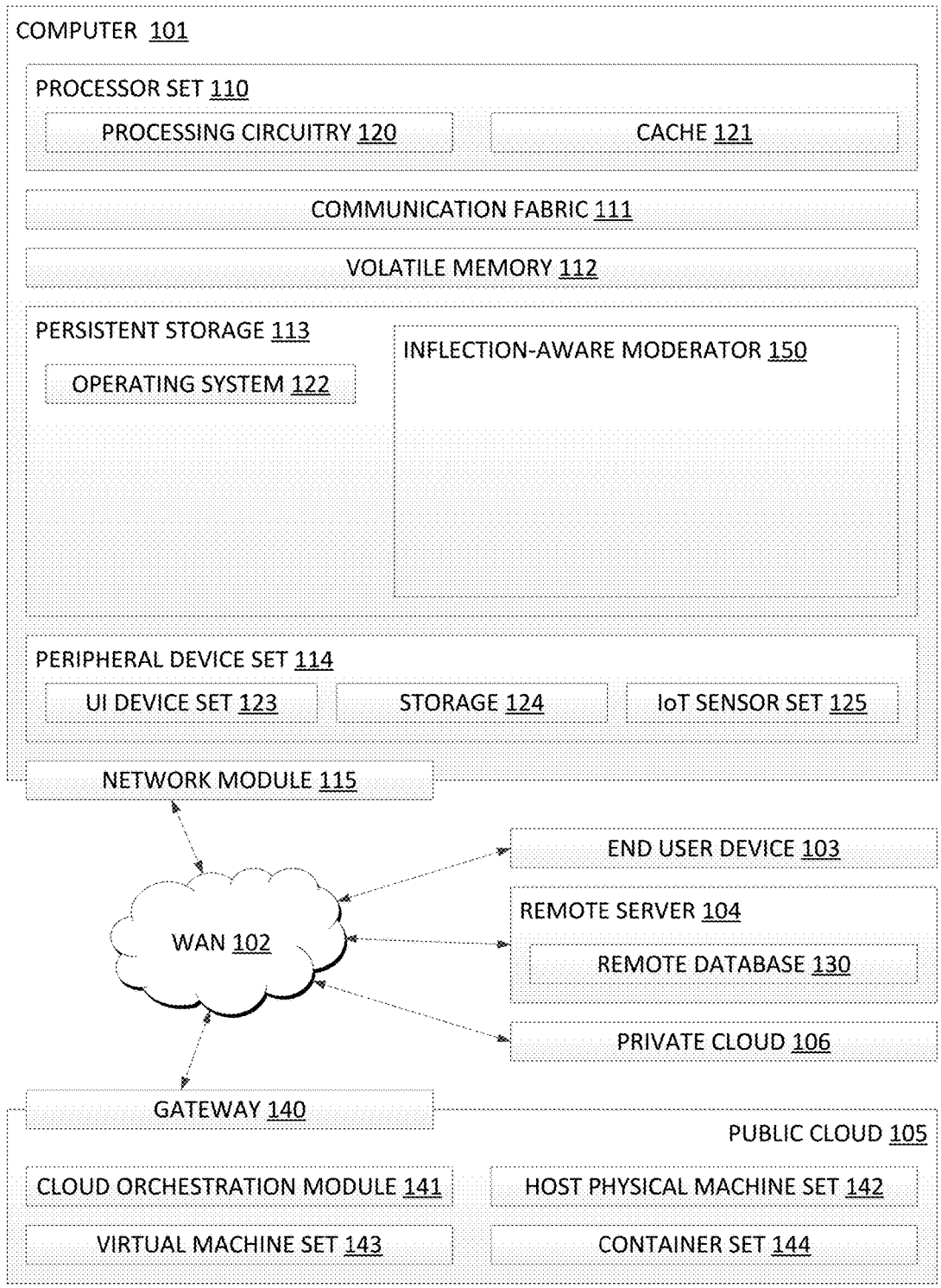
FIG. 1 depicts an exemplary block diagram depicting the components of computing environment 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Virtual conferencing can take the form of chat, audioconferencing, videoconferencing, and other collaborative conferencing platforms. The growth of virtual conferencing has grown an order of magnitude due to distanced business locations, improved networks, improved digital resources, increased online presence, and remote work, to name a few. As a result, it becomes particularly important to have definitive conference objectives, action items, and follow-ups in order to maintain productivity even while collaborating virtually. A lack thereof may invoke complacency or misdirected solutions, and silently induce financial and productivity losses.

The present invention discloses a means for an integrated virtual conferencing moderator that leverages cognitive capabilities related to natural language processing and vocal inflections to identify action points discussed within a conference. Moreover, the invention may log completion progress of the action items and schedule follow-up conferences based thereon.

FIG. 1 depicts an exemplary block diagram depicting the components of computing environment 100, in accordance with the exemplary embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as inflection-aware moderator 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user, and may take any of the forms discussed above with respect to computer 101. The EUD 103 may further include any components described with respect to computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
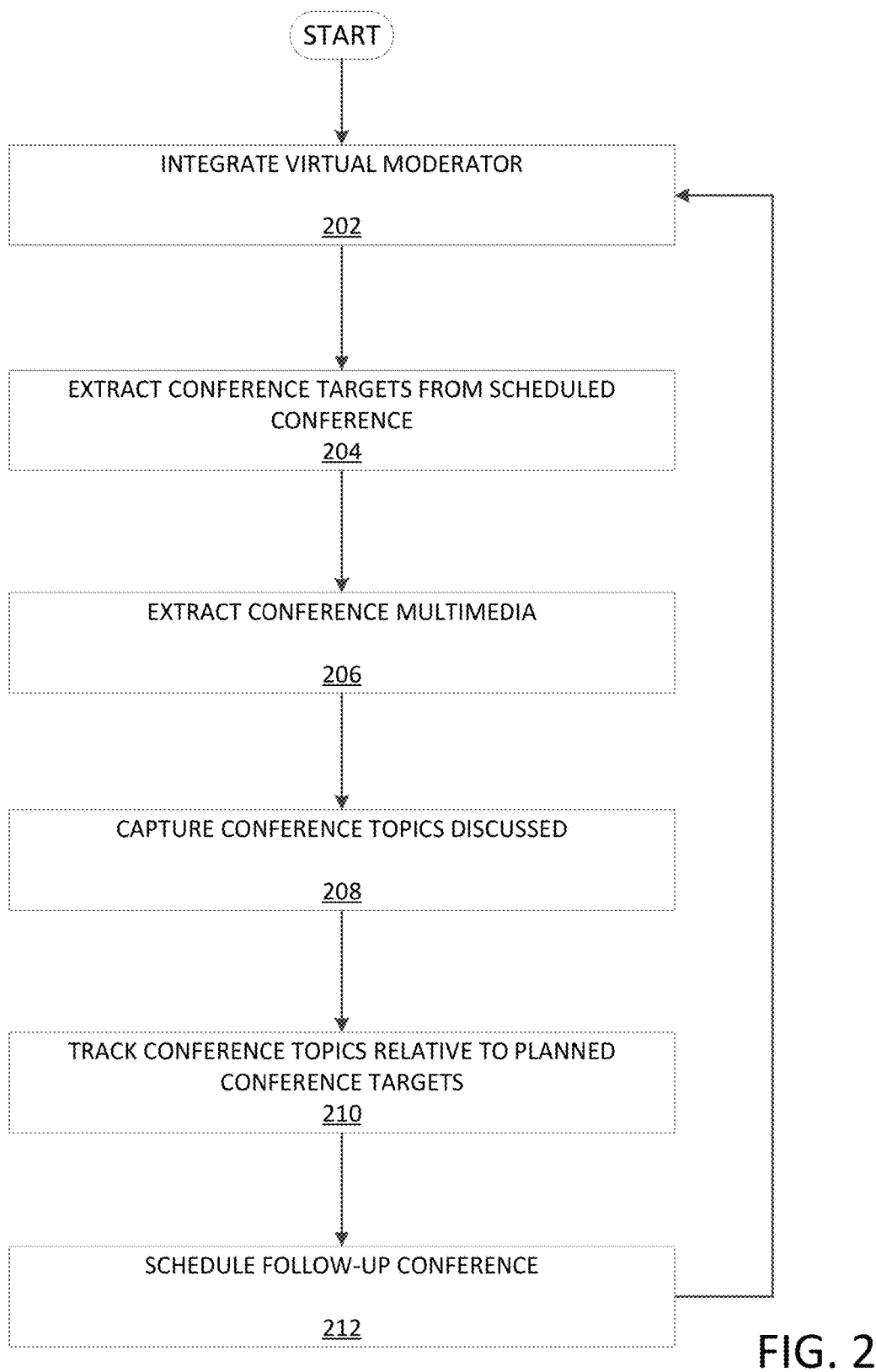
FIG. 2 depicts an exemplary flowchart 200 illustrating operations of inflection-aware moderator 150 of computing environment 100, in accordance with the exemplary embodiments.

FIG. 2 depicts an exemplary flowchart 200 illustrating the operations of inflection-aware moderator 150 of computing environment 100, in accordance with the exemplary embodiments. In embodiments, inflection aware moderator 200 may improve communication, collaboration, and efficiency of both individuals and corporations through improved conferencing platform moderation. The conferencing moderation may include generating a conference agenda based on a conference invitation or schedule, tracking a completion progress of the conference agenda, and scheduling follow-up conferences for unfinished action items.

Inflection-aware moderator 150 may be integrated with a communication platform (step 202). In embodiments, implementing the functionality of inflection-aware moderator 150 may be achieved through integration with an existing collaborative platform, such as a chat, teleconferencing, or videoconferencing program. The conferencing platform may further include functionality for scheduling conferences, including invitations to collaborate that include timing, topics, participants, etc. In other embodiments, inflection-aware moderator 150 may be configured to include functionality of such aforementioned conferencing platforms such that integration therewith is unnecessary.

In embodiments, the inflection-aware moderator 150 may preserve privacy rights of a user by first obtaining user consent to opt in for having collaborative communications recorded, from which a user may opt-out at any time. In addition, a user may configure user preferences, e.g., those indicating which conferencing platforms, conferences, times, invitees, etc. a user wishes to implement the functionality of inflection-aware moderator 150. Moreover, a user may additionally indicate which functionality is desired for such conferences, such as generating an itinerary of conferences targets, tracking conference targets, scheduling follow-up conferences, etc. Once integrated, inflection-aware moderator 150 may utilize pass through communication in order to extract communications within the conferencing platform. Here, pass through communication may allow inflection-aware moderator 150 to receive data streams transmitted and received by the integrated conference platform in real-time, such as text, audio, and video. Alternatively, in embodiments having a standalone inflection-aware moderator 150, such pass through communication may not be necessary.

In order to better illustrate the operations of inflection-aware moderator 150, reference is now made to an illustrative example wherein inflection-aware moderator 150 is integrated by a user into their existing work conferencing platform. The user configures inflection-aware moderator 150 to automatically initiate for audioconferencing and videoconferencing between normal work hours.

Inflection-aware moderator 150 may extract planned conference targets from a scheduled conference (step 204). In embodiments, a conference target may be any goal, such as a topic discussion, completion of a task (action items), brainstorming, etc. In embodiments, inflection-aware moderator 150 may extract conference targets from user data, such as a conference invitation or calendar entry. Inflection-aware moderator 150 may additionally extract a location of the conference, timing, invitees/participants, a title/context/core concepts of the conference, itinerary/agenda, attachments, etc. In embodiments, inflection-aware moderator 150 may extract the aforementioned information using techniques such as named entity recognition, natural language processing, topic analysis, etc. applied to a conference invite, user schedule, chat, conversational speech, etc. Inflection-aware moderator 150 may further extract conference details from a body, attachment, etc. of the conference invite or entry. In other embodiments, inflection-aware moderator 150 may receive user input specifying the aforementioned information, and in either case inflection-aware moderator 150 may store the extracted or received information in association with a date and time of the scheduled conference. Notably, only one instance of inflection-aware moderator 150 (e.g., implemented on any of a host computer, participant computer, hosting server, etc.) need be implemented in order to provide functionality for all participants of a conference, e.g., generate an agenda, schedule follow-up conferences, etc. As such, if desirable, inflection-aware moderator 150 can be implemented at a server level such that installation on individual devices may be unnecessary, such as those of a corporation.

In embodiments, inflection-aware moderator 150 may extract a timing of the conference and the planned conference targets (e.g., an agenda/itinerary) from a teleconference invitation. For example, a conference invitation may include an agenda detailing a list of topics and/or timeslots (i.e., time increment of the conference) at which to discuss each topic. Alternatively, or in addition, inflection-aware moderator 150 may determine timeslots at which each conference target is to be discussed based on the extracted conference targets (e.g., based on topics, context, core concepts, itinerary/agenda, etc.) and/or a duration of the conference. For example, inflection-aware moderator 150 may designate each conference target a timeslot within the conference based on dividing a duration of the conference by a number of identified conference targets (e.g., four topics over one hour can be split into four, fifteen-minute timeslots). Inflection-aware moderator 150 may also increase or decrease conference target timeslots based on, e.g., indications of importance, such as those having relatively more content extracted than others. Inflection-aware moderator 150 may modify timeslots based on conference targets identified as a focus of the conference, e.g., based on natural language processing techniques identifying phrases or keywords indicative of high priority. Inflection-aware moderator 150 may then prioritize such topics via scheduling, for example scheduling high priority conference targets at a first timeslot of the conference or a timeslot at which most, or critical, invitees indicated availability (e.g., invitees indicated as required in an invitation, historically most contributing, etc.). A user may configure inflection-aware moderator 150 to additionally reserve timeslots during the conference, for example an initial timeslot for introductions, a middle timeslot for a break, and a final timeslot for questions and answers. Inflection-aware moderator 150 may then add the reserved timeslot(s) to the agenda before recalculating the timeslots allotted to extracted conference targets.

Furthering the illustrative example introduced above, inflection-aware moderator 150 detects a conference invitation from a fellow co-worker and extracts conference targets of product improvements, product quality, budget, and brainstorming using natural language processing techniques. In addition, inflection-aware moderator 150 determines that, based on a one-hour conference time, a ten-minute opening remarks, and a ten-minute question and answer session, each conference target should receive around ten-minutes of discussion.

Inflection-aware moderator 150 may extract conference multimedia (step 206). In embodiments, inflection-aware moderator 150 may extract conference multimedia such as audio, video, chat, screensharing, etc., and do so in real-time during the scheduled conference. Inflection-aware moderator 150 may extract the multimedia using pass through communications and integration with (or standalone inclusion of) a conference program. Inflection-aware moderator 150 may begin extracting conference metadata at the scheduled conference time or upon detection of the user entering a conference. In embodiments where inflection-aware moderator 150 detects an unscheduled conference, inflection-aware moderator 150 may nonetheless extract all multimedia associated with the conference for later matching to conference targets and/or processing similar to that of scheduled conferences. In addition, inflection-aware moderator 150 may, for example, cross-reference participants or topics of an unscheduled meeting in order to categorize the unscheduled meeting.

In the aforementioned example, inflection-aware moderator 150 extracts chat, audio, video, and screensharing data from the work conference in real-time via pass through communication with the work conference platform.

Inflection-aware moderator 150 may extract topics discussed during the conference (step 208). In embodiments, inflection-aware moderator 150 may identify topics discussed during the conference based on the extracted conference multimedia streams. In particular, inflection-aware moderator 150 may identify conference topics by, e.g., applying natural language processing techniques to chat text and transcribed speech, video analysis to video streams, image recognition techniques to screenshared content, and the like. Inflection-aware moderator 150 may additionally apply techniques such as topic modelling, named entity recognition, and optical character recognition in identifying topics discussed.

In the aforementioned example, inflection-aware moderator 150 extracts conference metadata to detect conference topics discussed as: introductions for ten minutes of the conference, product improvements for twelve minutes, product quality for eight minutes, budget for eleven minutes, brainstorming for nine minutes, and Q&A for ten minutes.

Inflection-aware moderator 150 may track conference topics relative to planned conference targets (step 210). In embodiments, inflection-aware moderator 150 may be configured to detect when discussed topics are off-topic or off-timing. Once having identified a topic of discussion during the conference, inflection-aware moderator 150 may continuously compare the topic and a time of the topic discussion with the conference agenda generated above. If the topic of discussion does not appear within the conference agenda entirely, inflection-aware moderator 150 may remind a host or participant of the conference targets via, e.g., push notification or emphasis of an agenda. In embodiments where a discussion may go off-track, inflection-aware moderator 150 may be configured to collect off-topic data nonetheless or upon user response to the notification. For example, a host may dismiss the off-topic notification based on the topic, although not on the agenda, being important.

On the other hand, if inflection-aware moderator 150 determines that a discussion topic is on the agenda (i.e., a conference target or synonymous with), inflection-aware moderator 150 may determine whether the conference target is discussed within a designated timeslot. If so, the conference target is considered on track while, if not, the conference target is considered off-track. Inflection-aware moderator 150 may additionally compare the conference target of discussion to other topics on the agenda in order to detect conference targets discussed out-of-order. In some embodiments, inflection-aware moderator 150 may be configured to focus on a time allocated to each topic rather than an order. This may be advantageous when, e.g., a conference may jump between topics and it is more practical to monitor total time spent on a topic.

As a conference progresses, inflection-aware moderator 150 may mark conference targets, for example those which are completed or requiring follow-up. Inflection-aware moderator 150 may detect, e.g., conference target completion keywords, an intent to digress from conference targets, an intent to later return to conference targets, etc. using natural language processing techniques, e.g., keywords and phrases. Based on detecting keywords or key phrases indicating the completion of a conference target, e.g., indications a conference target is done, inflection-aware moderator 150 may mark the conference target as completed. Alternatively, and based on detecting indications of digression from a conference target or an intent to return to a conference target, inflection-aware moderator 150 may mark the conference target as needing follow-up.

Inflection-aware moderator 150 may additionally capture inflection of participants speaking during the conference for use in marking conference targets complete or as needing follow-up. Inflection-aware moderator 150 may collect inflection data from conference participants, for example distinguishing participants based on voiceprint, then process the inflection against a previous or historical inflection of the participant. Here, inflection may be detected in order to identify an importance and, in some cases, a need to follow-up on a conference target. For example, inflection may denote when multiple participants are speaking above one another or when a participant is enthusiastic about a conference target. These variations inflection-aware moderator 150 may capture based on the inflection exceeding a relative or absolute threshold for a period of time. In addition, inflection-aware moderator 150 may detect input from multiple users, e.g., via detecting of multiple voiceprints or inputs from multiple sources, indicating more discussion is needed. If a multi-user discussion and/or inflection of one or more users is detected, inflection-aware moderator 150 may flag the corresponding topic as needing follow-up. Similarly, if inflection-aware moderator 150 detects multiple participants speaking at once for a predefined period of time or in an amount exceeding a threshold within a duration of time, inflection-aware moderator 150 may similarly flag a topic as needing follow-up. Alternatively, if inflection-aware moderator 150 detects inflection due to celebration or jubilation, inflection-aware moderator 150 may mark a conference target as complete.

In the aforementioned example where each conference target of product improvement, product quality, budget, and brainstorming are each allotted ten minutes of discussion, inflection-aware moderator 150 determines that the discussion of the conference target product improvements went two minutes over its timeslot, product quality went two minutes short of its timeslot, budget went a minute over its timeslot, and brainstorming went one minute under its timeslot. Moreover, inflection-aware moderator 150 determines that the discussion of product improvements and budget indicated an intent to return to the topic but failed to do so, and therefore inflection-aware moderator 150 marks the topics product improvements and budget as requiring follow-up. Alternatively, inflection-aware moderator 150 identifies indications that conference targets product quality and brainstorming were completed, and therefore inflection-aware moderator 150 marks them as such.

Inflection-aware moderator 150 may schedule a follow-up conference (step 212). In embodiments, inflection-aware moderator 150 may schedule a follow-up conference for topics marked as requiring follow-up by checking the availability of participants (e.g., via a schedule/planner) and scheduling a follow-up conference. The follow-up conference may include a description of the conference target(s) requiring follow-up and any previous progress or notes made. In embodiments, inflection-aware moderator 150 may invite all previous attendees or only invite necessary invitees, e.g., only those previously engaged in multi-user discussion, and may only plan for a duration similar to that of the original timeslot designated. For example, if fifteen minutes were not enough to complete discussion of a conference target in a first conference, inflection-aware moderator 150 may schedule an additional fifteen-minute conference for follow-up at a time of availability for relevant participants. In embodiments, inflection-aware moderator 150 may determine whether the conference is recurring and, if so, instead add the conference targets requiring follow-up to an agenda for the next scheduled conference, if not already listed. In cases where the conference target is already listed in a next scheduled conference, inflection-aware moderator 150 may amend the agenda to include content extracted from the previous conference such that a next conference can pick up where the last left off and avoid redundant discussion.

Concluding the aforementioned example, inflection-aware moderator 150 schedules a follow-up conference for the conference targets of product improvements and budget, which were marked as requiring a follow-up. Alternatively, if inflection-aware moderator 150 determines that the necessary participants are meeting again at a recurring or similarly described meeting, inflection-aware moderator 150 may add product improvements and budget to an agenda of the next meeting.

The invention claimed is:

1. A method for conferencing moderation, the method comprising:
   extracting one or more conference targets from a conference;
   extracting one or more discussion topics from the conference in real-time via application of natural language processing techniques to text and transcribed speech corresponding to the conference;
   tracking a progress of completing the one or more conference targets based on the one or more discussion topics;
   based on determining that the conference is off-track by comparing the one or more conference targets to the one or more discussion topics, notifying a host of the conference;
   labelling the one or more conference targets as completed or requiring follow-up based on the progress of completing the one or more conference targets; and
   for the one or more conference targets labelled as requiring follow-up, scheduling a follow-up conference.

2. The method of claim 1, wherein extracting one or more discussion topics from the conference in real-time further comprises:
   applying image recognition techniques to at least one of image and video stream corresponding to the conference.

3. The method of claim 1, wherein tracking a progress of completing the one or more conference targets further comprises:
   correlating a conference target of the one or more conference targets with a discussion topic of the one or more discussion topics; and
   identifying an indication of completion of the conference target via natural language processing techniques.

4. The method of claim 1, wherein labelling the one or more conference targets as completed or requiring follow-up further comprises:
   identifying an increase in vocal inflection of one or more participants of the conference when discussing the one or more conference targets.

5. The method of claim 1, wherein determining whether the conference is off-track further comprises:
   extracting an agenda corresponding to the conference, wherein the agenda details at least one of an order and a timing of discussing the one or more conference targets;
   comparing the agenda to the one or more discussion topics.

6. The method of claim 5, wherein the one or more conference targets are extracted from the agenda.

7. A computer program product for conferencing moderation, the computer program product comprising:
   one or more non-transitory computer-readable storage media and program instructions stored on the one or more non-transitory computer-readable storage media capable of performing a method, the method comprising:
   extracting one or more conference targets from a conference;
   extracting one or more discussion topics from the conference in real-time via application of natural language processing techniques to text and transcribed speech corresponding to the conference;
   tracking a progress of completing the one or more conference targets based on the one or more discussion topics;
   based on determining that the conference is off-track by comparing the one or more conference targets to the one or more discussion topics, notifying a host of the conference;
   labelling the one or more conference targets as completed or requiring follow-up based on the progress of completing the one or more conference targets; and
   for the one or more conference targets labelled as requiring follow-up, scheduling a follow-up conference.

8. The computer program product of claim 7, wherein extracting one or more discussion topics from the conference in real-time further comprises:

applying image recognition techniques to at least one of image and video stream corresponding to the conference.

9. The computer program product of claim 7, wherein tracking a progress of completing the one or more conference targets further comprises:
   correlating a conference target of the one or more conference targets with a discussion topic of the one or more discussion topics; and
   identifying an indication of completion of the conference target via natural language processing techniques.

10. The computer program product of claim 7, wherein labelling the one or more conference targets as completed or requiring follow-up further comprises:
   identifying an increase in vocal inflection of one or more participants of the conference when discussing the one or more conference targets.

11. The computer program product of claim 7, wherein determining whether the conference is off-track further comprises:
   extracting an agenda corresponding to the conference, wherein the agenda details at least one of an order and a timing of discussing the one or more conference targets;
   comparing the agenda to the one or more discussion topics.

12. The computer program product of claim 11, wherein the one or more conference targets are extracted from the agenda.

13. A computer system for conferencing moderation, the system comprising:
   one or more computer processors, one or more computer-readable storage media, and program instructions stored on the one or more of the computer-readable storage media for execution by at least one of the one or more processors capable of performing a method, the method comprising:
      extracting one or more conference targets from a conference;
      extracting one or more discussion topics from the conference in real-time via application of natural language processing techniques to text and transcribed speech corresponding to the conference;
      tracking a progress of completing the one or more conference targets based on the one or more discussion topics;
      based on determining that the conference is off-track by comparing the one or more conference targets to the one or more discussion topics, notifying a host of the conference;
      labelling the one or more conference targets as completed or requiring follow-up based on the progress of completing the one or more conference targets; and
      for the one or more conference targets labelled as requiring follow-up, scheduling a follow-up conference.

14. The computer system of claim 13, wherein extracting one or more discussion topics from the conference in real-time further comprises:
   applying image recognition techniques to at least one of image and video stream corresponding to the conference.

15. The computer system of claim 13, wherein tracking a progress of completing the one or more conference targets further comprises:
   correlating a conference target of the one or more conference targets with a discussion topic of the one or more discussion topics; and
   identifying an indication of completion of the conference target via natural language processing techniques.

16. The computer system of claim 13, wherein labelling the one or more conference targets as completed or requiring follow-up further comprises:
   identifying an increase in vocal inflection of one or more participants of the conference when discussing the one or more conference targets.

17. The computer system of claim 13, wherein determining whether the conference is off-track further comprises:
   extracting an agenda corresponding to the conference, wherein the agenda details at least one of an order and a timing of discussing the one or more conference targets;
   comparing the agenda to the one or more discussion topics.

\* \* \* \* \*